US012808509B2

(12) United States Patent
Buzzurro et al.

(10) Patent No.: US 12,808,509 B2
(45) Date of Patent: Nov. 24, 2026

(54) ASSEMBLY METHOD OF AN AUTOMOTIVE LIGHTING UNIT AND MACHINE IMPLEMENTING SUCH METHOD

(71) Applicant: Marelli Automotive Lighting Italy S.p.A. Con Socio Unico, Venaria Reale (IT)

(72) Inventors: Alessandro Buzzurro, Tolmezzo (IT); Domenico Ferigo, Tolmezzo (IT)

(73) Assignee: Marelli Automotive Lighting Italy S.P.A. Con Unico Socio, Venaria Reale (IT)

( * ) Notice: Subject to any disclaimer, the term of this patent is extended or adjusted under 35 U.S.C. 154(b) by 18 days.

(21) Appl. No.: 18/894,323

(22) Filed: Sep. 24, 2024

(65) Prior Publication Data

US 2025/0102129 A1 Mar. 27, 2025

(30) Foreign Application Priority Data

Sep. 25, 2023 (EP) .................................... 23199296
Sep. 25, 2023 (EP) .................................... 23199313
Sep. 25, 2023 (EP) .................................... 23199334

(51) Int. Cl.
*F21S 43/20* (2018.01)
*B23K 26/21* (2014.01)
(Continued)

(52) U.S. Cl.
CPC ........... *F21S 43/2811* (2024.05); *B23K 26/21* (2015.10); *B23K 26/32* (2013.01); *F21S 41/285* (2018.01); *F21S 41/29* (2018.01); *F21S 2243/00* (2024.05)

(58) Field of Classification Search
CPC ................................ B23K 26/21; B23K 26/32
(Continued)

(56) References Cited

U.S. PATENT DOCUMENTS 4,195,828 A * 4/1980 Peterson ............ B23K 37/0533 269/287
6,575,444 B1 * 6/2003 Bidaud .............. B23K 37/0443 269/155
(Continued)

FOREIGN PATENT DOCUMENTS

EP 2923819 A1 9/2015
EP 2923820 A1 9/2015
(Continued)

OTHER PUBLICATIONS

Search Report from related European Patent Application No. 23199296.7 issued Mar. 13, 2024.
(Continued)

*Primary Examiner* — Jason L Vaughan
(74) *Attorney, Agent, or Firm* — McCarter & English, LLP

(57) ABSTRACT

An assembly method of an automotive lighting unit and an automotive lighting unit that includes one or more internal components made of opaque polymeric material, which are fixed in abutment on the inner surface of the rear casing at respective contact areas or zones; the assembly method comprising the steps of realizing the rear casing; realizing at least one internal lighting component having at least one portion made of opaque polymeric material; placing said at least one internal lighting component inside the rear casing, with said portion made of opaque polymeric material resting on the rear casing, in at least one contact zone; and making at least one laser welding joint at said contact area, so as to rigidly secure said at least one internal lighting component to the rear casing.

21 Claims, 6 Drawing Sheets

(51) Int. Cl.

| | |
|---|---|
| ***B23K 26/32*** | (2014.01) |
| ***F21S 41/20*** | (2018.01) |
| ***F21S 41/29*** | (2018.01) |

(58) Field of Classification Search

USPC ............... 269/43, 136, 134; 29/281.1, 426.4, 29/426.5, 426.6, 234, 280

See application file for complete search history.

(56) References Cited

U.S. PATENT DOCUMENTS

| | | | | |
|---|---|---|---|---|
| 7,377,503 | B2 * | 5/2008 | Yajima | B23K 37/0443 29/281.1 |
| 7,798,459 | B2 * | 9/2010 | Dickson | B25B 5/06 269/282 |
| 7,900,898 | B2 * | 3/2011 | Wampler, II | B23Q 3/069 269/95 |
| 7,966,729 | B2 * | 6/2011 | Frauen | B64F 5/10 29/281.1 |
| 8,046,895 | B2 * | 11/2011 | Sherrill | B25J 15/0061 29/281.4 |
| 9,061,468 | B2 * | 6/2015 | Sagesaka | B29C 66/542 |
| 2004/0070988 | A1 | 4/2004 | Trimpe et al. | |
| 2016/0068209 | A1 * | 3/2016 | Sakamoto | B25B 11/02 29/281.1 |

FOREIGN PATENT DOCUMENTS

| | | | |
|---|---|---|---|
| EP | 2949452 | A1 | 12/2015 |
| EP | 2957418 | A1 | 12/2015 |
| EP | 3388222 | A1 | 10/2018 |
| EP | 3470212 | A1 | 4/2019 |
| EP | 3608086 | A1 | 2/2020 |

OTHER PUBLICATIONS

Search Report from related European Patent Application No. 23199313.0 issued Mar. 15, 2024.

Search Report from related European Patent Application No. 23199334.6 issued Mar. 13, 2024.

* cited by examiner

ASSEMBLY METHOD OF AN AUTOMOTIVE LIGHTING UNIT AND MACHINE IMPLEMENTING SUCH METHOD

CROSS-REFERENCE TO RELATED APPLICATIONS

This patent application claims priority from European Patent Application No. 23199313.0, European Patent Application No. 23199334.6 and European Patent Application No. 23199296.7, all filed on Sep. 25, 2023, the entire disclosures of which are incorporated herein by reference.

TECHNICAL FIELD

The present invention relates to an assembly method of an automotive lighting unit and to a machine implementing such method.

In further detail, the present invention relates to a method and a machine for welding components made of opaque plastic material inside the rear casing of a headlight or taillight for cars and similar motor vehicles. Use to which the following disclosure will explicitly refer without thereby losing in generality.

STATE OF THE ART

As known, a headlight or taillight for cars and similar motor vehicles is conventionally a lighting apparatus which is specifically structured to be located in the front, rear or lateral part of the vehicle, and which performs the function of lighting the area surrounding the vehicle and/or the function of signalling the position of the vehicle, sudden deceleration of the vehicle and/or turning direction of the vehicle, in compliance with given photometric type-approval standards.

The majority of taillights for cars and similar motor vehicles usually comprise: a rear casing with a substantially rigid and opaque structure, which is substantially basin-shaped and is structured so as to be stably recessed into a compartment specifically made in the rear part of the vehicle body; a front half-shell with a substantially rigid and transparent structure, separate and distinct from the rear casing, which is substantially complementary in shape to the mouth of the rear casing and is arranged to close the mouth of the rear casing, usually so as to surface outside of the vehicle body; and a series of electrically-powered lighting assemblies, which are located inside the rear casing, each immediately beneath a corresponding transparent or semi-transparent sector of the front half-shell, so as to selectively backlight the overlying transparent or semi-transparent sector of the front half-shell.

Generally each transparent or semi-transparent sector of the front half-shell is moreover uniquely associated with a specific light signal, hence the various lighting assemblies present inside the hollow housing formed/delimited by the front half-shell and by the rear casing are structured so as to emit, on command, a light beam that, once exited from the lighting unit through the corresponding transparent or semi-transparent sector of the half-shell, meets the photometric type-approval standards (colour and light distribution of the light) decided for said light signal.

Currently, both the rear casing and the front half-shell have a monolithic structure and are made of polymeric material via injection moulding.

In further detail, the rear casing is entirely made of opaque polymeric material, while the front half-shell is entirely or almost entirely made of transparent and/or semi-transparent polymeric material.

In the latest headlights and taillights, furthermore, the front half-shell is joined in a non-removable manner to the rear casing via a laser welding that runs along the entire perimeter rim of the mouth of the rear casing.

The lighting assemblies located inside the rear casing, in turn, usually use a series of LEDs (acronym of Light Emitting Diode) as light sources, and generally also include one or more reflector bodies that reflect the light produced by the LEDs towards the facing transparent or semi-transparent sector of the front half-shell, and/or one or more light-guide bodies that collect the light produced by the LEDs and channels it by total internal reflection to the facing transparent or semi-transparent sector of the front half-shell.

In addition, these lighting assemblies usually also comprise filters, corrective optics, shielding masks and/or other active and/or passive optical devices, which are able to adapt the light beam emitted by the various LEDs to the photometric and aesthetic requirements related to automotive use.

Lastly, these lighting assemblies are also provided with bezels, brackets and/or other support elements that rest on the inner surface of the rear casing, and are structured to support the printed circuit board(s) accommodating the LEDs, the electric wiring, the reflector body/bodies, the light-guide body/bodies and/or the other active and/or passive optical devices that contribute to form each lighting assembly.

Currently the majority of the components that contribute to form the lighting assemblies of the taillight (for example the reflector bodies, the shielding masks, the bezels, the brackets and/or the other support elements) are made of opaque polymeric material and are fixed to the rear casing by means of a series of self-threading metal screws, the majority of which are inserted in pass-through manner in the rear casing from the outside towards the inside of the lighting unit, so as to arrange the head of the screw in abutment against the outer surface of the casing.

In addition, some internal components of the automotive lighting units can be retained inside the rear casing also by a series of shoulders, centring pins and/or snap-on locking tabs realized inside the rear casing. These centring and/or snap-on locking systems, however, are used only during assembly of the lighting unit, because they aren't generally able to withstand the mechanical vibrations which the automotive lighting units are normally subject to during use.

Currently, therefore, the self-threading screws are the only means able to securely fix the main components or macro-components of the automotive lighting unit in place inside the rear casing for the entire life of the same automotive lighting unit.

The present-day assembly lines for automotive lighting units, therefore, are currently provided with a series of automatic or semi-automatic screwdrivers, which enable the operators working on the assembly line to place and screw the self-threading screws in the rear casing as rapidly as possible.

Unfortunately, although essential for realizing the taillight, the self-threading screws make assembly of the taillight relatively laborious and also significantly affect the overall weight and cost of the lighting unit. Being made of metal, the self-threading screws are some of the most costly components of the lighting unit.

In addition, the self-threading screws occasionally jam inside the automatic screwdriver, making the tool unserviceable, with all the problems that this entails. Restoring the automatic or semi-automatic screwdriver, in fact, can require several minutes, during which the assembly line is necessarily at a standstill.

OBJECT OF THE INVENTION

Aim of the present invention is to eliminate or in any case minimize the use of self-threading screws, so as to simplify and speed up the assembly of the automotive lighting units.

In accordance with these aims, according to the present invention there is provided an assembly method of an automotive lighting unit as defined in Claim 1 and preferably, though not necessarily, in any one of the dependent claims.

In addition, according to the present invention, there is provided an automotive-lighting-units assembly machine as defined in Claim 10 and preferably, though not necessarily, in any one of the dependent claims.

Lastly, according to the present invention, there is provided an automotive lighting unit.

BRIEF DESCRIPTION OF THE FIGURES

The present invention will now be described with reference to the attached drawings, which illustrate a non-limiting embodiment example thereof, in which:

FIG. 8 is a schematic lateral view of a first variation of the automotive-lighting-units assembly machine illustrated in FIG. 1, with parts in section and parts removed for clarity's sake; whereas

DETAILED DISCLOSURE OF EMBODIMENTS

Figure 1:
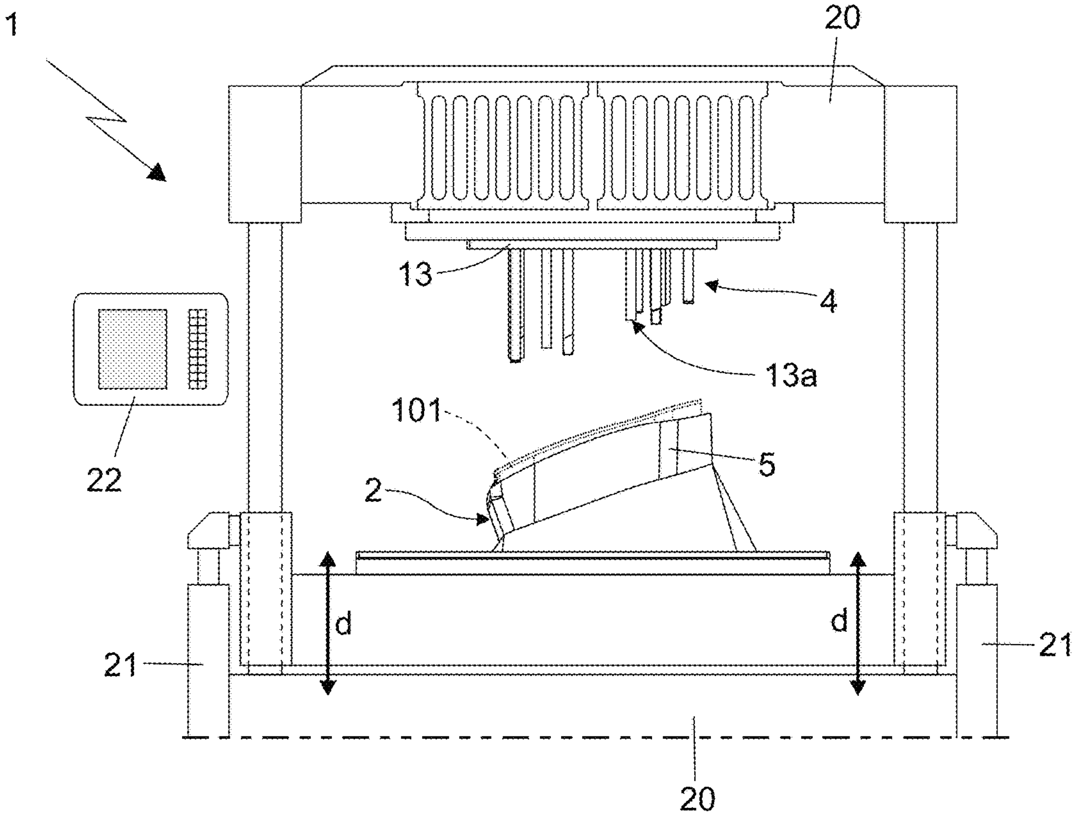
FIG. 1 is a schematic front view of an automotive-lighting-units assembly machine realized according to the teachings of the present invention, with parts in section and parts removed for clarity's sake.

With reference to FIGS. 1 and from 4 to 7, number 1 denotes as a whole a automotive-lighting-units assembly machine, which is adapted to carry out the laser welding of plastic pieces.

In further detail, the machine 1 is specifically structured to laser weld, directly on the rear casing of an automotive lighting unit 100, at least part of the components made of polymeric material, which concur in forming the automotive lighting unit 100 and are located inside said automotive lighting unit 100, or rather inside the rear casing thereof.

The term "automotive lighting unit" denotes a lighting apparatus structured to be firmly fixed to the front or rear part of the body of a motor vehicle (not illustrated), with the function of emitting light signals adapted to signal/indicate the position of the vehicle and/or the sudden deceleration of the vehicle and/or the turning direction of the vehicle during travel and/or with the function of lighting the area surrounding the vehicle.

In other words, the automotive lighting unit 100 is adapted to be fixed to the front or rear part of the vehicle body of a car, van, lorry, motorcycle, or other similar motor vehicle, to perform the function of a headlight or taillight.

Optionally, the automotive lighting unit 100 may also be used to display luminous signs and/or graphic or alphanumeric symbols.

Clearly the automotive lighting unit 100 may also be arranged on a lateral side of the car or other similar motor vehicle.

Preferably the automotive lighting unit 100 is furthermore structured so as to be stably recessed in the vehicle body (not illustrated) and so as to surface outside of the latter.

Figure 2:
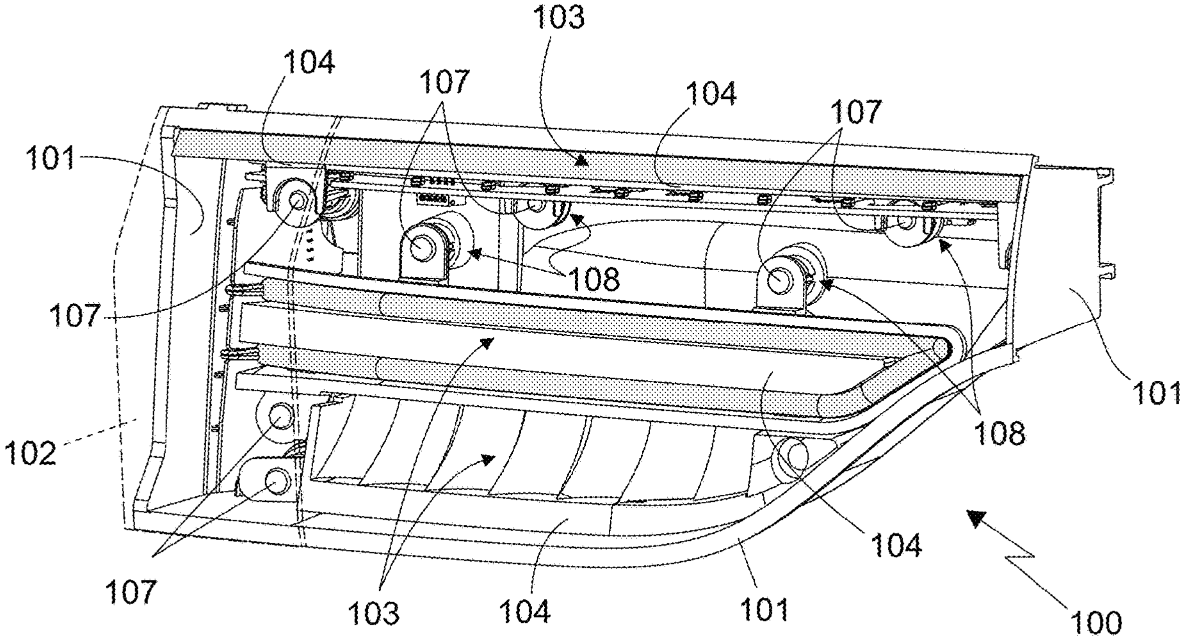
FIG. 2 is a perspective view of an automotive lighting unit realized according to the teachings of the present invention, with parts in section and parts removed for clarity's sake.
Figure 3:
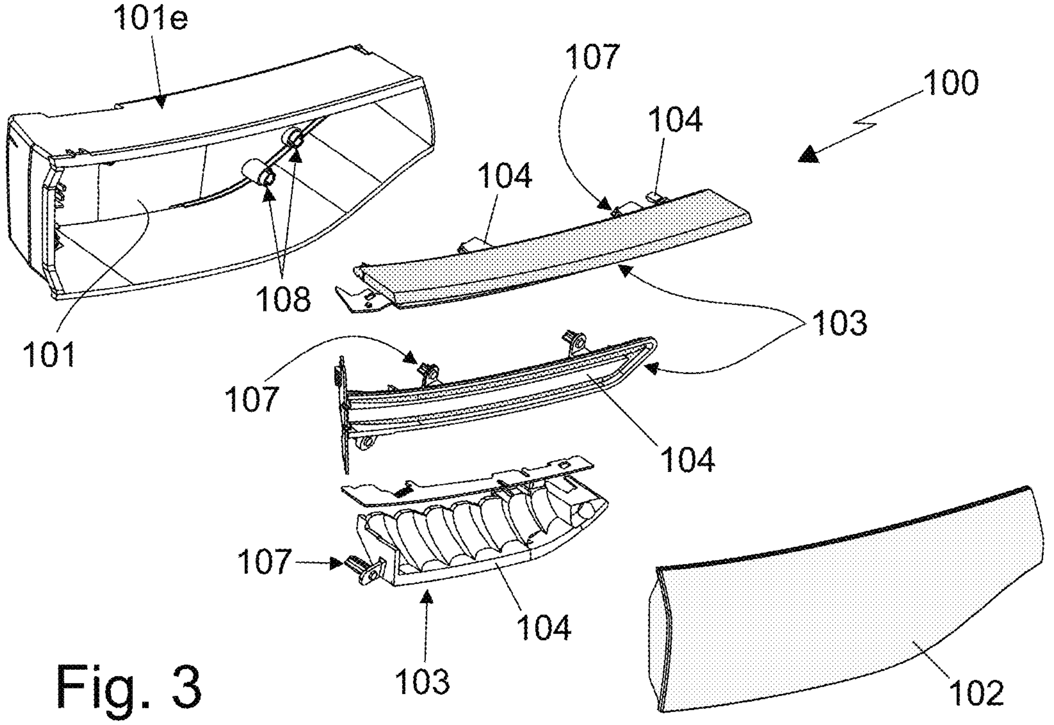
FIG. 3 is a partially-exploded perspective view of the automotive lighting unit illustrated in FIG. 2, with parts removed for clarity's sake.

With reference to FIGS. 2 and 3, in particular, the automotive lighting unit 100 comprises: a rear casing 101 with a structure substantially rigid and advantageously also substantially opaque to visible light, which is concave in shape and is adapted to be firmly fixed to the vehicle body (not illustrated), preferably inside a seat specifically realized in the same body; and a front half-shell 102 with a structure substantially rigid and also at least partially transparent to visible light, separate and distinct from the rear casing 101, which is roughly lenticular in shape and is firmly fixed to the rear casing 101 to close the mouth of the latter, so as to form, together with the same rear casing 101, an internally hollow, rigid housing.

Preferably the front half-shell 102 is furthermore shaped/structured so as to surface outside of the vehicle body and/or so as to substantially entirely close the mouth of the rear casing 101, thus forming, together with the same rear casing 101, a closed and internally hollow, rigid housing.

In further detail, the rear casing 101 is preferably shaped substantially in the form of an advantageously oblong, basin and/or has a nominal thickness preferably ranging between 1 and 4 mm (millimetres).

In addition, the rear casing 101 preferably has a monolithic structure, and is at least partially made of polymeric material. In other words, the rear casing 101 is partly made of polymeric material opaque to visible light, advantageously via injection moulding.

Analogously, the front half-shell 102 preferably has a monolithic structure, and is at least partially made of polymeric material. In other words, the front half-shell 102 is at least partially made of transparent polymeric material, advantageously via injection moulding.

With reference to FIGS. 2 and 3, in addition the automotive lighting unit 100 also comprises a series of internal lighting components that concur in forming one or more lighting assemblies 103, each of which is located inside the rear casing 101 and is adapted to backlight the front half-shell 102.

In the illustrated example, in particular, the automotive lighting unit 100, or rather the rear casing 101, is preferably structured so as to be recessed into the rear part of the vehicle body of a car or other similar motor vehicle.

In other words, the automotive lighting unit 100 is preferably a taillight for cars and the like.

Obviously, in a different embodiment the automotive lighting unit 100 may also be structured so as to be simply fixed cantilever on the front, lateral or rear part of the vehicle body (not illustrated).

Preferably the rear casing 101 is moreover provided, on the outer surface, with a series of bushings and/or other fixing appendages that allow the rear casing 101 to be rigidly attached to the vehicle body (not illustrated).

In the illustrated example, in particular, the rear casing 101 is preferably substantially entirely made of opaque polymeric material.

In further detail, in the illustrated example, the rear casing 101 is preferably made of acrylonitrile-butadiene-styrene (ABS) or other polymeric material, advantageously filled with carbon black or other opacifying pigments.

Obviously, in a different embodiment, the rear casing 101 may also be shaped and/or structured so as to be at least partially recessed into a seat specifically realized in the front or lateral part of the vehicle body (not illustrated), or so as to be simply fixed cantilever on the front, lateral or rear part of the vehicle body.

With reference to FIGS. 2 and 3, the front half-shell 102, on the other hand, is provided with one or more transparent or semi-transparent sectors (i.e. sectors that allow the passage of visible light), optionally also having different colours from one another, and is rigidly fixed to the rear casing 101 preferably in a substantially fluid-tight manner. Clearly the front half-shell 102 may also include one or more opaque sectors adjoining said transparent or semi-transparent sector(s).

In addition, the front half-shell 102 preferably has a shape substantially complementary to the mouth of rear casing 101, and is preferably firmly fixed to the rear casing 101 along the perimeter rim of said mouth.

Preferably the front half-shell 102 is furthermore directly welded to the rear casing 101.

In further detail, the front half-shell 102 is preferably directly welded to the rear casing 101 substantially seamlessly along the whole perimeter rim of the mouth of rear casing 101.

In the illustrated example, in particular, the front half-shell 102 is preferably made of transparent polycarbonate (PC), transparent polymethylmethacrylate (PMMA) or other transparent or semi-transparent polymeric material.

Preferably the front half-shell 102 is moreover welded in known manner to the rear casing 101 via laser welding, vibration welding or hot-plate welding.

With reference to FIGS. 2 and 3, in turn the lighting assembly or assemblies 103 is/are located inside the rear casing 101 preferably aligned each to a corresponding transparent or semi-transparent sector of front half-shell 102, and each of them is adapted to emit light so as to backlight the facing transparent or semi-transparent sector of half-shell 102, preferably separately and independently of the other lighting assemblies 103.

In greater detail, the lighting assembly or assemblies 103 is/are preferably electrically-powered lighting assemblies that is/are adapted to emit light on command and are advantageously also entirely accommodated inside the rear casing 101.

Preferably the/each of the lighting assemblies 103 is moreover structured so as to emit, on command, a light beam that, once exited from the automotive lighting unit 100 through the front half-shell 102, meets the photometric type-approval standards (light colour and distribution) decided for a given light signal.

Clearly one or some lighting assemblies 103 may also emit a light beam that does not meet or must meet said photometric type-approval standards.

In further detail, with reference to FIGS. 2, 3 and 5-8, the automotive lighting unit 100 additionally includes a series of internal lighting components, separate and distinct from the rear casing 101 and from the front half-shell 102, which concur in forming the lighting assembly/assemblies 103.

Some of these internal lighting components, furthermore, are substantially rigid and at least partially made of polymeric material opaque to visible light.

In addition, one or more of these internal lighting components made of opaque polymeric material, denoted in the following by number 104, is/are arranged with the part made of opaque polymeric material resting on the inner surface of the rear casing 101 at specific mutual contact areas or zones 105, and are rigidly and non-removably fixed directly to the same rear casing 101 by means of at least one laser welding joint 106 made at said mutual contact area(s) 105.

Clearly the internal lighting component(s) 104 may also be made entirely of polymeric material opaque to visible light.

Preferably the contact area(s) 105 between the rear casing 101 and the internal lighting component 104 are furthermore substantially flat.

The laser welding joint 106, on the other hand, is preferably substantially spotlike. Clearly the laser welding joint 106 may also have the shape of a line.

In other words, each internal lighting component 104 is arranged with the part made of opaque polymeric material resting on the inner surface of the rear casing 101 in at least one contact area or zone 105, and is rigidly and non-removably fixed to the rear casing 101 via at least one laser welding joint 106 made at the same contact area or zone 105.

At the mutual contact area 105, therefore, the rear casing 101 and the internal component 104 are both made of polymeric material opaque to visible light.

Clearly the laser welding joint 106 is made in the contact area 105, straddling a portion of the rear casing 101 and the adjacent portion of the internal lighting component 104, both made of opaque polymeric material.

Preferably the rear casing 101 and the internal lighting component(s) 104, at the contact area 105, are made of opaque polymeric materials which have laser-beam absorption coefficients μ (Beer-Lambert law) different from one another.

More specifically, at the contact area 105, the difference between the laser-beam absorption coefficients μ of the opaque polymeric materials, respectively, of the rear casing 101 and of the internal lighting component(s) 104 is preferably greater than 35% of the laser-beam absorption coefficient μ with higher value.

In the illustrated example, in particular, the internal component(s) 104 preferably has/have a monolithic structure, and is/are preferably made entirely of polymeric material opaque to visible light, advantageously via injection moulding.

In addition, the internal lighting component or components 104 preferably include, for example, one or more reflector bodies and/or shielding masks and/or corrective lenses and/or diffuser filters and/or coloured lenticular filters and/or reflectors and/or fixing bezels and/or brackets or other auxiliary support structures, which are at least partially made of polymeric material opaque to visible light, and are arranged with the part made of opaque polymeric material resting on the inner surface of rear casing 101.

Figure 8:
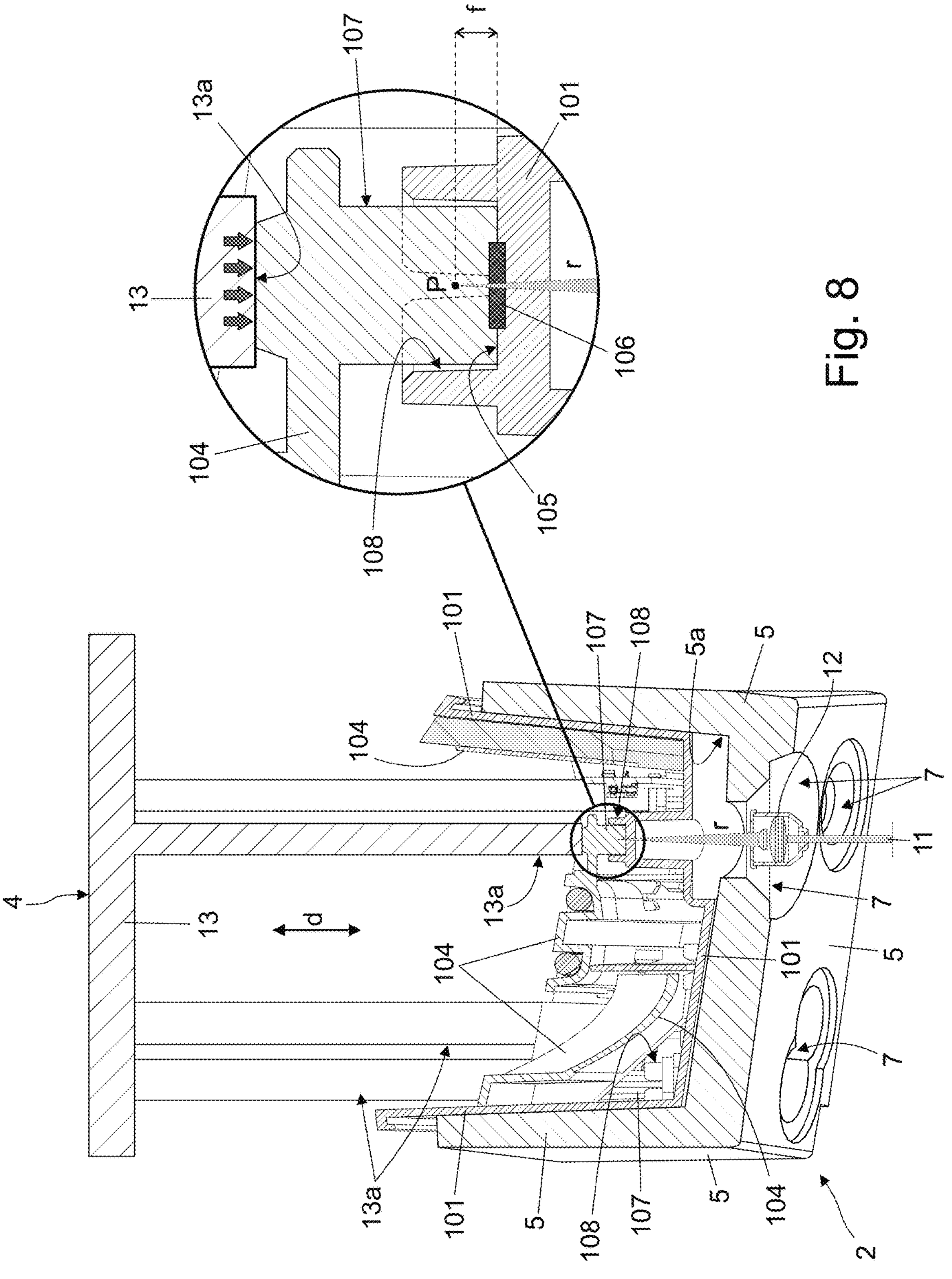

With reference to FIGS. 2 and 8, preferably the rear casing 101 and the/each internal lighting component 104 are moreover shaped/structured so as to realize, in the mutual contact area 105, a shape coupling.

In further detail, the rear casing 101 and the internal component 104 are preferably shaped/structured so as to realize, in the mutual contact area(s) 105, a male-female coupling.

More specifically, the/each internal component 104 is preferably provided with one or more protruding fixing pins 107 clearly made of opaque polymeric material, each of which extends parallel to a predefined insertion direction do, and is adapted to arrange its distal end in abutment against the inner surface of rear casing 101, at a contact area 105.

Moreover the laser welding joint 106 is preferably located at the distal end of the fixing pin 107.

In addition, the/each fixing pin 107 is preferably also adapted to engage a corresponding receiving seat 108, which is preferably substantially cup-shaped, and is realized directly on rear casing 101, or rather on the bottom of rear casing 101.

Preferably the mutual contact area 105 is furthermore located inside said receiving seat 108.

In further detail, the distal end of fixing pin 107 is preferably adapted to rest stably on the bottom of receiving seat 108, and therefore the contact area or zone 105 is preferably located on the bottom of said receiving seat 108.

In even further detail, the receiving seat 108 preferably has a shape substantially complementary to that of the distal end of the fixing pin 107.

Clearly, in a different embodiment, the fixing pins may protrude cantilevered from the bottom of rear casing 101 and the receiving seats may be located on the internal lighting component(s) 104.

In this alternative embodiment, obviously, the protruding fixing pins are provided with a central blind hole having its bottom at short distance from the contact area 105.

In other words, in this alternative embodiment the fixing pins are internally hollow.

Optionally the automotive lighting unit 100 may also comprise one or more cameras and/or one or more photosensitive sensors and/or one or more radar devices and/or one or more LiDAR (acronym of Light Detection and Ranging) instruments and/or other supplementary electronic devices, again accommodated inside the rigid housing formed/delimited by the rear casing 101 and by the front half-shell 102.

Even said supplementary electronic device or devices preferably include, or may include, one or more internal lighting components 104 which is/are at least partially made of opaque polymeric material, is/are arranged with the part/portion made of opaque polymeric material resting on the inner surface of the rear casing 101 in at least one contact area or zone 105, and is/are fixed in a rigid non-removable manner to the rear casing 101 by means of at least one laser welding joint 106 made at said contact area or zone 105.

With reference to FIGS. 1 and from 4 to 8, the automotive-lighting-units assembly machine 1 is adapted to make the laser welding joint or joints 106 that, at the contact area(s) or zone(s) 105, are adapted to secure the internal component(s) 104 in a rigid and non-removable manner directly to the rear casing 101, or rather directly to the inner surface of the rear casing 101.

The welding machine 1 firstly comprises: a workpiece carrying fixture 2, which is structured to temporarily accommodate and advantageously also retain a rear casing 101 with one or more internal components 104 inside; and a laser appliance 3 which, on command, is adapted to generate and direct at least one laser beam r towards/against the rear casing 101 at that moment placed in the workpiece carrying fixture 2.

In further detail, the workpiece carrying fixture 2 is structured so as to temporarily accommodate and advantageously also retain the rear casing 101 with one or more internal lighting components 104 resting on the inner surface of the same rear casing 101, at respective contact area or zones 105.

In other words, the workpiece carrying fixture 2 is adapted to accommodate a rear casing 101 provided with at least one sector made of opaque polymeric material, and also at least one internal component 104 which, in turn, is located inside the rear casing 101 and is provided with at least one portion made of opaque polymeric material, which rests on the sector made of opaque polymeric material of the rear casing 101 in at least one contact area or zone 105.

The laser appliance 3, in turn, is adapted to generate and direct at least one laser beam r towards the workpiece carrying fixture 2, in a direction such as to intersect at least one contact area 105 between the rear casing 101 and an internal lighting component 104, in order to form at least one laser welding joint 106 at said contact area 105.

Preferably, said at least one laser beam r moreover has a wavelength λ advantageously higher than 400 nm (nanometres) and more conveniently higher than 900 nm (nanometres).

In addition, the workpiece carrying fixture 2 and the laser appliance 3 are overall structured so that the laser beam(s) r reach the contact area(s) 105 between the rear casing 101 and the internal component(s) 104 passing through the thickness of the rear casing 101 accommodated/stationary in the workpiece carrying fixture 2.

In other words, the workpiece carrying fixture 2 and the laser appliance 3 are overall structured so that the laser beam(s) r, before reaching the contact area(s) 105 between the rear casing 101 and the internal lighting component(s) 104, reach/strike the outer surface 101*e* of the rear casing 101 accommodated in the workpiece carrying fixture 2, passing through the same workpiece carrying fixture 2.

Clearly the outer surface 101*e* is the part of the surface of the rear casing 101 that remains outside of the automotive lighting unit 100 when the front half-shell 102 is welded or otherwise fixed to the mouth of the rear casing 101.

In further detail, the workpiece carrying fixture 2 is provided with a seat adapted to accommodate the rear casing 101 with one or more internal lighting components 104 inside.

In addition, the workpiece carrying fixture 2 is also provided with one or more, preferably in air, internal laser paths each of which is structured so as to allow the laser beam(s) r to pass through said workpiece carrying fixture 2 substantially without energy losses or with minimum energy losses, up to reach the seat accommodating the rear casing 101 and the rear casing 101 located therein.

In other words, the/each internal laser path of the workpiece carrying fixture 2 is structured so as to allow the laser beam(s) r of the laser appliance 3 to pass through the workpiece carrying fixture 2 more or less without energy losses, up to reach the outer surface 101*e* of the rear casing 101 stationary in the workpiece carrying fixture 2.

In even greater detail, the/each internal laser path extends through the workpiece carrying fixture 2 up to the receiving seat intended to accommodate the rear casing 101, is substantially aligned to a contact area 105 between the rear casing 101 and an internal component 104, and is structured so as to allow the laser beam(s) r of the laser appliance 3 to pass through the workpiece carrying fixture 2 up to said receiving seat, more or less without energy losses.

The laser appliance 3, in turn, is coupled to the workpiece carrying fixture 2 so that the laser beam(s) r reach the receiving seat of the rear casing 101 travelling through the internal laser path(s) of the workpiece carrying fixture 2.

The laser beam(s) r of the laser appliance 3 therefore reach the rear casing 101, or rather the bottom of rear casing 101, without engaging/crossing the mouth of said rear casing 101.

Preferably the machine 1 additionally includes a locking assembly 4 which is adapted to immobilize and/or press one or more of the internal lighting components 104 present inside the rear casing 101 stationary in the workpiece carrying fixture 2, against the inner surface of the same rear casing 101.

In further detail, the locking assembly 4 is movable from and towards the workpiece carrying fixture 2 or vice versa, so as to selectively couple with the workpiece carrying fixture 2 to immobilize and/or press, against the inner surface of the rear casing 101 accommodated in the workpiece carrying fixture 2, the internal lighting component or components 104 present inside the rear casing 101.

In other words, the locking assembly 4 is structured so as to freely penetrate into the rear casing 101 momentarily accommodated in the workpiece carrying fixture 2 through the mouth of said rear casing 101, and there immobilize and/or press at least a part of the internal lighting component(s) 104 present inside the rear casing 101 in abutment against the inner surface of said rear casing 101, at the relative contact/support area(s) or zone (s) 105.

With reference to FIGS. 1 and 4 to 8, in particular, the workpiece carrying fixture 2 includes: a workpiece carrying template 5 with a substantially non-deformable structure, which is preferably made of metallic material, and is provided with a compartment 5*a* shaped/structured to accommodate the rear casing 101 with the concavity accessible from the outside; and preferably also one or more, advantageously electrically- or pneumatically-operated, locking members or devices (not visible in the figures) which are adapted to selectively lock/immobilize the rear casing 101 in the receiving compartment 5*a* of workpiece carrying template 5.

In further detail, the receiving compartment 5*a* of workpiece carrying template 5 is structured so as to accommodate the rear casing 101 with one or more internal lighting components 104 inside, and is superiorly provided with an access mouth through which the rear casing 101 is inserted and removed from said compartment 5*a*.

Preferably the receiving compartment 5*a* of workpiece carrying template 5 furthermore has a shape substantially complementary to that of the rear casing 101.

In addition, the workpiece carrying template 5 is provided with one or more, advantageously in air, internal through passages 7 each of which extends through the body of said workpiece carrying template 5 up to the receiving compartment 5*a*, and is shaped/structured so as to allow one or more laser beams r emitted by the laser appliance 3 to freely cross the workpiece carrying template 5 and reach the rear casing 101 that engages the receiving compartment 5*a*.

In further detail, the/each internal through passage 7 is structured to allow one or more laser beams r emitted by the laser appliance 3 to pass through the workpiece carrying template 5 substantially without energy losses, and reach the outer surface 101*e* of the rear casing 101.

The/each through passage 7 of the workpiece carrying template 5, moreover, ends inside the receiving compartment 5*a* so as to be locally substantially aligned to a corresponding contact area or zone 105 between the rear casing 101 that engages the receiving compartment 5*a*, and an internal component 104 present inside the rear casing 101.

The laser appliance 3, in turn, is adapted to direct the laser beam(s) r towards the receiving compartment 5*a* of the workpiece carrying template 5, through the internal through passage(s) 7 of the workpiece carrying template 5, so that the/each laser beam r reaches the corresponding contact area 105 passing through the thickness of the rear casing 101 that engages the receiving compartment 5*a*.

Figure 4:
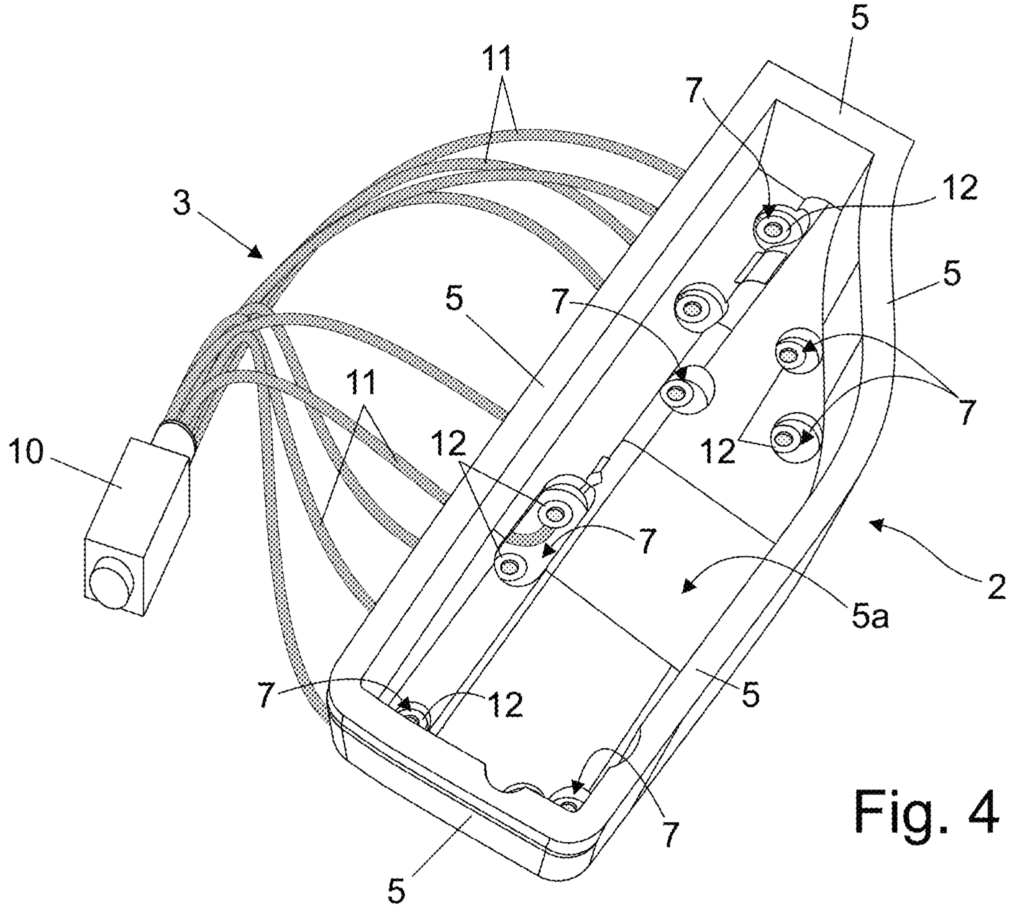
FIG. 4 is a perspective view of a part of the machine illustrated in FIG. 1, with parts removed for clarity's sake.
Figure 7:
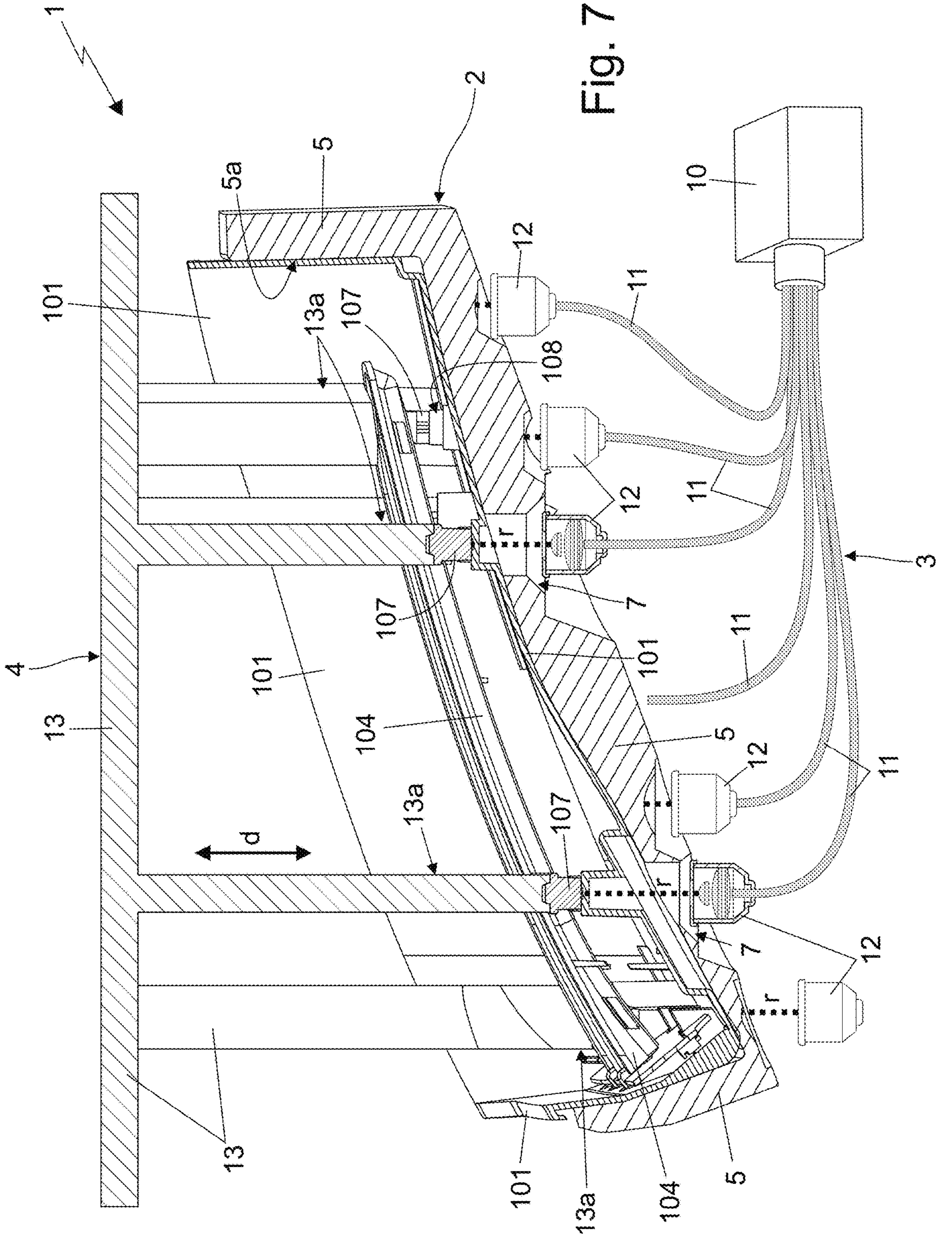

In further detail, with reference to FIGS. 4, 7 and 8, the/each internal through passage 7 of workpiece carrying template 5 preferably ends on the bottom of the receiving compartment 5*a* of workpiece carrying template 5, so as to be locally aligned to the overlying contact/support area 105 between the rear casing 101 and the internal lighting component 104.

In the illustrated example, in particular, the/each through passage 7 of the workpiece carrying template 5 preferably basically consists of a pass-through hole, opening or straight duct, that crosses the bottom of the receiving compartment 5*a* of the workpiece carrying template 5, and is locally aligned to a respective contact/support area or zone 105 present inside the rear casing 101 momentarily accommodated in the receiving compartment 5*a* of the workpiece carrying template 5.

The/each internal through passage 7 of the workpiece carrying template 5, or rather the/each pass-through hole, opening or rectilinear duct, is therefore located in the workpiece carrying template 5 on the side opposite to the mouth of the receiving compartment 5*a*.

With particular reference to FIGS. 4, 7 and 8, in turn the laser appliance 3 preferably comprises: at least one electrically-powered laser source 10 which is capable of emitting, on command, a high-power laser beam, advantageously with predefined and substantially constant intensity and/or emission spectrum; and one or more optic fibres 11, each of which ends at an internal laser path of the workpiece carrying fixture 2, and is optically coupled to the laser source 10 so as to channel the laser beam to said internal laser path.

In other words, each optic fibre 11 ends at a respective internal through passage 7 of the workpiece carrying template 5, and is optically coupled to the laser source 10 so as to channel the laser beam emitted by the laser source 10 up to the same internal through passage 7.

Preferably the distal end of the/each optic fibre 11, in addition, is adapted to direct/address its laser beam inside the workpiece carrying fixture 2, towards a corresponding contact area or zone 105 between the rear casing 101 and an internal component 104.

In other words, the distal end of the/each optic fibre 11 is adapted to direct/address its laser beam towards the receiving compartment 5*a* of the workpiece carrying template 5, through a relative through passage 7 of the workpiece carrying template 5.

Preferably, the laser source 10 is furthermore adapted to emit a laser beam with nominal power higher than 10 watt and/or a wavelength $\lambda_0$ preferably higher than 400 nm (nanometres) and more expediently higher than 900 nm (nanometres).

In addition, the laser appliance 3 preferably also comprises, for the/each optic fibre 11, an optical beam conditioning device 12, which is located downstream of the optic fibre 11 so as to be crossed by the laser beam r coming out of said optic fibre 11, and is structured so as to collimate and advantageously also focus the laser beam r directed towards the corresponding contact area or zone 105 between the rear casing 101 and an internal component 104.

In other words, the/each optical beam conditioning device 12 is locally aligned with a respective through passage 7 of the workpiece carrying fixture 2, and is adapted to direct the laser beam r coming out of the optic fibre 11 into the facing through passage 7 of the workpiece carrying fixture 2, towards the contact area 105 which is locally aligned to said through passage 7.

In further detail, the/each optical beam conditioning device 12 preferably comprises one or more lenses advantageously of the meniscus and/or planoconvex type, which are arranged one after the other so as to be crossed by the laser beam r coming out from the optic fibre 11.

With reference to FIG. 8, preferably the laser appliance 3 is furthermore structured so as to focus/concentrate the laser beam r directed towards the/each contact area 105 in a predefined point in space, in the following called focal point P, which is located beyond the internal laser path of the workpiece carrying fixture 2, inside the workpiece carrying fixture 2 and at the back of (downstream of) the contact area 105 between the rear casing 101 and the internal component 104. Preferably the distance f between the focal point P and the contact area 105 is moreover less than 3 mm (millimetres) and advantageously also greater than 0.2 mm (millimetres).

In other words, the focal point P is located on the opposite side of the contact area 105 with respect to the origin of the laser r, or rather with respect to the laser appliance 3, and is spaced from said contact area 105.

Clearly the laser welding joint 106 will always form at the contact area 105.

In further detail, the laser appliance 3 is preferably provided with an optical focusing system, which is structured so as to shape substantially in the form of a cone the laser beam r directed towards the/each contact area 105, and the distance f between the focal point P, or rather the vertex of the cone, and the contact area 105 preferably ranges between 0.2 and 2 mm (millimetres), and more advantageously between 0.5 and 1.5 mm (millimetres).

Clearly, the laser beam r is shaped in the form of a cone before reaching the outer surface 101*e* of the rear casing 101 accommodated in the workpiece carrying fixture 2.

In a less sophisticated embodiment, however, the focal point P could be located at the contact area 105.

With reference to FIG. 8, in the illustrated example, in particular, the/each optical beam conditioning device 12 is preferably structured so as to concentrate the laser beam r that crosses the same device in a focal point P, which is located inside the receiving compartment 5*a* of the workpiece carrying template 5, spaced at the back of the contact area 105 towards which the laser beam r is directed.

In addition, the/each optical beam conditioning device 12 is preferably also structured so that the laser beam r, before reaching the outer surface 101*e* of rear casing 101, forms a cone with an opening angle advantageously raging between 10° and 90°.

With reference to FIGS. 1 and 4 to 8, in the illustrated example, in particular, the workpiece carrying fixture 2 is preferably provided with a plurality of internal through passages 7.

The laser appliance 3, in turn, is preferably provided with a bundle of optic fibres 11, which end at the various through passages 7 of the workpiece carrying fixture 2, or rather of the workpiece carrying template 5, and are optically coupled to the laser source 10 so as to split and channel the high-power laser beam to the various through passages 7 of the workpiece carrying template 5.

In further detail, the bundle of optic fibres 11 are preferably optically coupled to the laser source 10 so as to split the high-power laser beam into substantially equal parts between the various optic fibres 11 of the bundle.

Clearly, in a different embodiment, the bundle of optic fibres 11 may be coupled to the laser source 10 so as to distribute the laser beam emitted by the laser source 10 in a differentiated manner between the various optic fibres 11 of the bundle. For example, a higher laser power may be channelled towards the optic fibre 11 that has its distal end very far from the corresponding contact area or zone 105 between the rear casing 101 and the internal component 104.

The distal end of each optic fibre 11, on the other hand, is preferably firmly coupled to a corresponding optical beam conditioning device 12 which, in turn, is aligned to or is placed at the relative through passage 7 of the workpiece carrying fixture 2, and is structured so as to direct the laser beam r coming out of the optic fibre 11 towards the contact area or zone 105 located downstream of the internal through passage 7.

In addition, the/each optical beam conditioning device 12 is preferably firmly anchored to the workpiece carrying fixture 2, or rather to the workpiece carrying template 5, and is advantageously also structured so as to engage at least partially the relative through passage 7 of the workpiece carrying fixture 2, or rather a relative through hole, opening or straight duct present in the body of the workpiece carrying template 5.

With reference to FIGS. 1 and 6 to 8, the locking assembly 4, in turn, is preferably located in front of the workpiece carrying fixture 2, or rather in front of the seat present on the workpiece carrying fixture 2 and accommodating the rear casing 101, and is movable substantially rectilinearly from and towards said workpiece carrying fixture 2 or vice versa.

In further detail, the locking assembly 4 is preferably located in front of the mouth of the receiving compartment 5*a* of workpiece carrying template 5, and is movable substantially rectilinearly from and towards said compartment 5*a*.

In addition, the locking assembly 4 preferably includes a locking template 13 with a substantially non-deformable structure, which is advantageously made of metallic material, and is provided with one or more shaped protrusions 13*a*, each of which is shaped so as to freely penetrate into the rear casing 101 momentarily accommodated in the workpiece carrying fixture 2 through the mouth of the same rear casing 101, and so as to immobilize and/or press a corresponding internal component 104 firmly in abutment on the inner surface of the rear casing 101, clearly at a relative contact area or zone 105.

In further detail, the locking template 13 is preferably provided with one or more shaped protrusions 13*a*, which extend cantilevered parallel to the direction d of movement of the locking assembly 4 from and towards the workpiece carrying fixture 2 or vice versa.

Preferably, the distal end of each shaped protrusion 13*a* of the locking template 13 has a shape substantially complementary to the portion of the internal lighting component 104 against which the shaped protrusion 13*a* is designed to rest.

In further detail, the shaped protrusion(s) 13*a* of the locking template 13 are preferably shaped/structured so as to be arranged in abutment on the corresponding internal lighting component(s) 104 present inside the rear casing 101, each at the back of a respective fixing pin 107 of the internal lighting component 104.

Optionally the locking assembly 4 may also comprise preferably pneumatically-operated, pressing members which are mounted on the locking template 13 and are adapted to exert a thrust/pressure on the internal lighting component(s) 104 on which the shaped protrusion(s) 13*a* rest.

With reference to FIGS. 1 and 4 to 8, in the illustrated example, in particular, the workpiece carrying fixture 2 and the locking assembly 4 are preferably arranged spaced one above the other, vertically aligned with each other, and are preferably movable substantially rectilinearly from and towards each other.

In further detail, the workpiece carrying template 5 is preferably oriented with the mouth of receiving compartment 5*a* turned upwards, so that the internal component(s) 104 remain by gravity in place inside the rear casing 101 temporarily accommodated in the same workpiece carrying template 5.

The locking assembly 4, or rather the locking template 13, in turn, is preferably arranged spaced above the workpiece carrying fixture 2, or rather above the workpiece carrying template 5, with the shaped protrusion(s) 13*a* turned downwards, i.e. towards the workpiece carrying template 5.

Preferably the locking assembly 4, or rather the locking template 13, is furthermore stationary in space, whereas the workpiece carrying fixture 2, or rather the workpiece carrying template 5, and advantageously also at least part of the laser appliance 3 is/are movable vertically from and towards the locking assembly 4, or rather the locking template 13.

Clearly, in a different embodiment, the locking assembly 4, or rather the locking template 13, may move rectilinearly from and towards the workpiece carrying fixture 2 that instead remains stationary in space.

With reference to FIG. 1, in particular, the machine for automotive-lighting-units assembly 1 is preferably provided with a rigid supporting framework 20, which is structured to be stably rested on and optionally also rigidly anchored to the ground.

The workpiece carrying fixture 2 and the locking assembly 4 are preferably located on the supporting framework 20 one above the other, vertically aligned with each other.

In further detail, the locking assembly 4 is preferably fixed on the top of supporting framework 20, with the locking template 13, or rather the shaped protrusion(s) 13*a* of the locking template 13, turned downwards.

The workpiece carrying fixture 2, on the other hand, is preferably fixed on the supporting framework 20 spaced below the locking assembly 4, with the mouth of the receiving compartment 5*a* of the workpiece carrying template 5 turned upwards, and with the capability of moving vertically from and towards the locking assembly 4.

The laser appliance 3, in turn, is preferably located on the supporting framework 20 beneath the workpiece carrying fixture 2, or rather below the workpiece carrying template 5.

In addition, the automotive-lighting-units assembly machine 1 preferably also comprises: an advantageously pneumatically- or hydraulically-operated, moving device 21 which is adapted to vertically move the workpiece carrying fixture 2 from and towards the locking assembly 4; and an electronic control device 22 which is adapted to command the moving device 21.

In further detail, the moving device 21 is adapted to move, on command, the workpiece carrying fixture 2 between a raised position (see FIGS. 1, 6, 7 and 8) in which the workpiece carrying template 5 is at a predefined minimum distance from the locking template 13 of locking assembly 4, and a lowered position (see FIGS. 1 and 5) in which the workpiece carrying template 5 is at a predefined maximum distance from the locking template 13 of locking assembly 4.

In the raised position, the shaped protrusion(s) 13*a* of locking template 13 penetrate inside the rear casing 101 accommodated in the workpiece carrying fixture 2, so as to reach and press at least a part of the internal component(s) 104 present inside the rear casing 101 against the inner surface of the same rear casing 101, at the related contact area(s) or zone(s) 105.

In the lowered position, the shaped protrusion(s) 13*a* of the locking template 13 are instead far from the workpiece carrying template 5 so as not to hinder, or rather to facilitate, removal and insertion of the rear casing 101 from/into the compartment 5*a* of the workpiece carrying template 5.

In further detail, in the illustrated example, the supporting framework 20 preferably has a gantry structure, and is therefore provided with at least one pair of vertical uprights and an upper crossbeam that extends more or less horizontally and bridge-like between the upper ends of the vertical uprights.

The locking assembly 4 is preferably rigidly fixed to the upper crossbeam of supporting framework 20. The workpiece carrying fixture 2, on the other hand, is preferably fixed above a movable platform, which is located spaced beneath the upper crossbeam and is advantageously coupled in a vertically slidable manner to the vertical uprights of the supporting framework 20.

The moving device 21, on the other hand, preferably comprises a pair of double-acting hydraulic cylinders or the like, which are arranged in a vertical position each beside a respective vertical upright of supporting framework 20, and are adapted to raise and lower, on command, the movable platform that accommodates the workpiece carrying fixture 2.

Clearly, in a different embodiment, the moving system of machine 1 may move vertically the locking assembly 4 from and towards the workpiece carrying fixture 2, or may move vertically both the workpiece carrying fixture 2 and the locking assembly 4.

The assembly of automotive lighting unit 100 firstly comprises the step of realize, preferably via injection moulding, the rear casing 101; and the step of producing, preferably via injection moulding, at least one internal lighting component 104 having at least a part/portion made of opaque polymeric material. Preferably, the rear casing 101 furthermore has a structure substantially opaque to visible light, i.e. it is advantageously made of opaque polymeric material.

After having realized the rear casing 101 and the internal lighting component(s) 104, the assembly of automotive lighting unit 100 comprises the step of placing said at least one internal lighting component 104 inside the rear casing 101, with the part/portion made of opaque polymeric material resting on the inner surface of rear casing 101 in at least one contact area or zone 105; and then the step of making at least one laser welding joint 106 at said contact area or zone 105, so as to fix said at least one internal lighting component 104 in a rigid and substantially non-removable manner to the rear casing 101.

In addition, the step of making said at least one laser welding joint 106 entails directing at least one laser beam r against the outer surface 101*e* of the rear casing 101, so that the laser beam r reaches the contact area 105 between the rear casing 101 and the internal lighting component 104, or rather the part/portion made of opaque polymeric material of the internal lighting component 104, passing through the local thickness of the rear casing 101.

Preferably, at the contact area 105, the laser-beam absorption coefficient μ of the opaque polymeric material forming the rear casing 101 is lower than the laser-beam absorption coefficient μ of the opaque polymeric material forming the internal lighting component 104.

More specifically, the difference between the laser-beam absorption coefficient μ of the opaque polymeric material forming the rear casing 101 and the laser-beam absorption coefficient μ of the opaque polymeric material forming the internal lighting component 104 is preferably greater than 35% of the laser-beam absorption coefficient μ of the opaque polymeric material forming the internal lighting component 104.

In other words, the laser-beam absorption coefficient μ of the piece firstly crossed by the laser beam r is preferably lower, advantageously at least by 35%, than the laser-beam absorption coefficient μ of the piece crossed secondly by the same laser beam r.

In further detail, the step of making said at least one laser welding joint 106 entails directing one or more laser beams r towards the contact area 105, through the entire thickness of the rear casing 101, so that said laser beam(s) r reach and heat temporarily to melting temperature (only) the polymeric material in the neighbourhood of the contact area 105.

The/each laser welding joint 106 is therefore made straddling the rear casing 101 and the internal lighting component 104.

In even greater detail, the step of making said at least one laser welding joint 106 entails directing, for a predefined time interval advantageously less than 30 s (seconds), one or more laser beams r against the outer surface 101*e* of the rear casing 101, so that said laser beam(s) r can pass through the entire thickness of the rear casing 101 and reach the contact area or zone 105.

Once has/have reached the contact area or zone 105, the laser beam(s) r heat up (only) the polymeric material located in the neighbourhood of the contact area or zone 105 so as to bring it temporarily to the melting/softening temperature.

The subsequent re-hardening of the opaque polymeric material joins the two pieces in a rigid and non-removable manner, forming the laser welding joint 106.

In the illustrated example, in particular, the step of making said at least one laser welding joint 106 entails directing the laser beam(s) r against the outer surface 101*e* of rear casing 101, so that said laser beam(s) r can penetrate into the opaque polymeric material of the rear casing 101, and reach the internal component(s) 104 at the related contact area(s) 105.

The substantially cone-shaped form of the incident laser beam r allows a relatively low energy density to be maintained on the outer surface 101*e* of the rear casing 101 and in the initial part of the path of the laser beam r inside the rear casing 101 up to the contact area 105, advantageously such that said laser beam does not melt or otherwise damage the opaque polymeric material it has passed through.

Once the corresponding internal component 104 has been reached, each laser beam r locally heats the opaque polymeric material of the internal lighting component 104 up to the melting/softening temperature. More or less simultaneously, the heat produced is transmitted by conduction also to the opaque polymeric material that forms the rear casing 101, locally bringing also the second polymeric material to the melting temperature.

Figure 6:
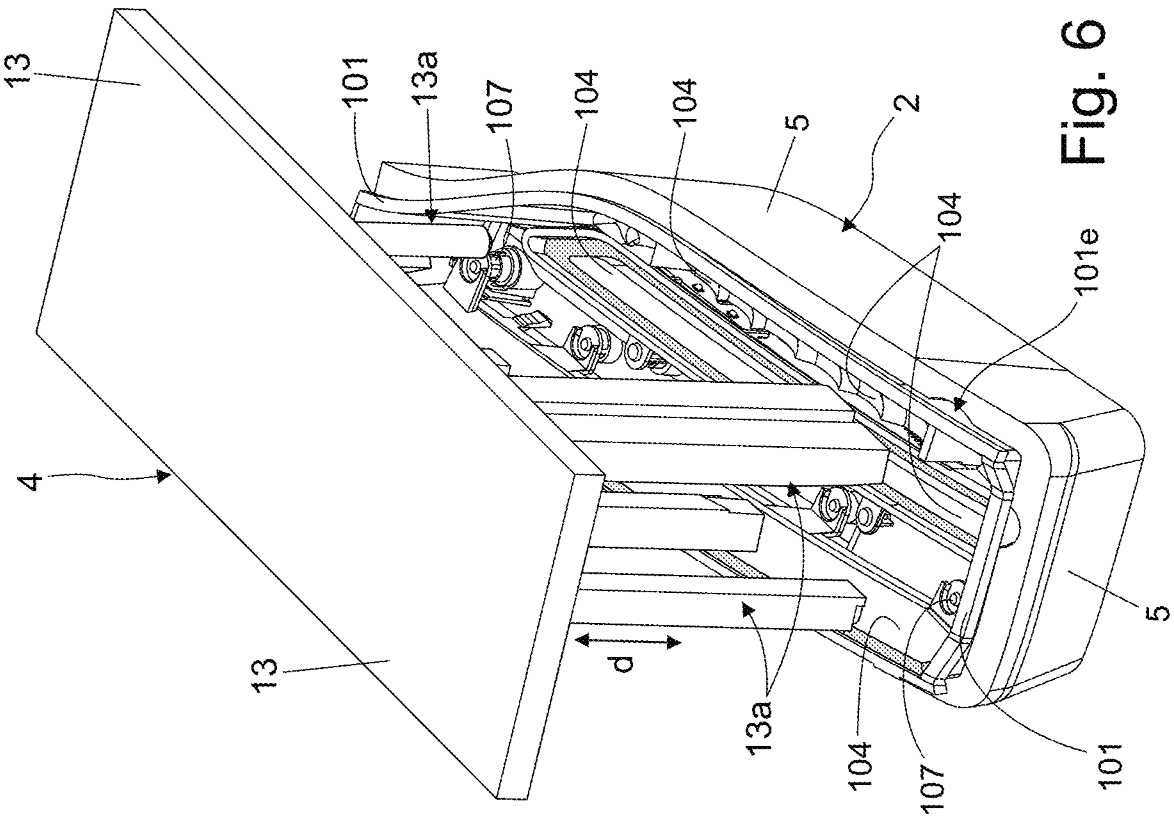
FIGS. 5, 6 and 7 show schematically some steps of the automotive-lighting-device assembly via the machine illustrated in FIG. 1.

With reference to FIGS. 6, 7 and 8, preferably the step of making said at least one laser welding joint 106 in addition provides also for pressing the internal component(s) 104 to be welded against the inner surface of the rear casing 101, at the/each contact area 105, while said laser beam(s) r heat up the polymeric material located in the neighbourhood of the contact area 105.

Lastly, the assembly of automotive lighting unit 100 preferably comprises, after the making of the various laser welding joints 106, also the step of welding the front half-shell 102 on the mouth of the rear casing 101. In other words, the assembly of automotive lighting unit 100 preferably ends with the welding of the front half-shell 102 on the mouth of rear casing 101.

Clearly the arrangement of the internal lighting components 104 inside the rear casing 101 and/or the welding of the internal lighting components 104 to the rear casing 101 may be carried out according to a predefined time sequence.

Operation of the automotive-lighting-units assembly machine 1 can be easily inferred from the above description.

Figure 5:
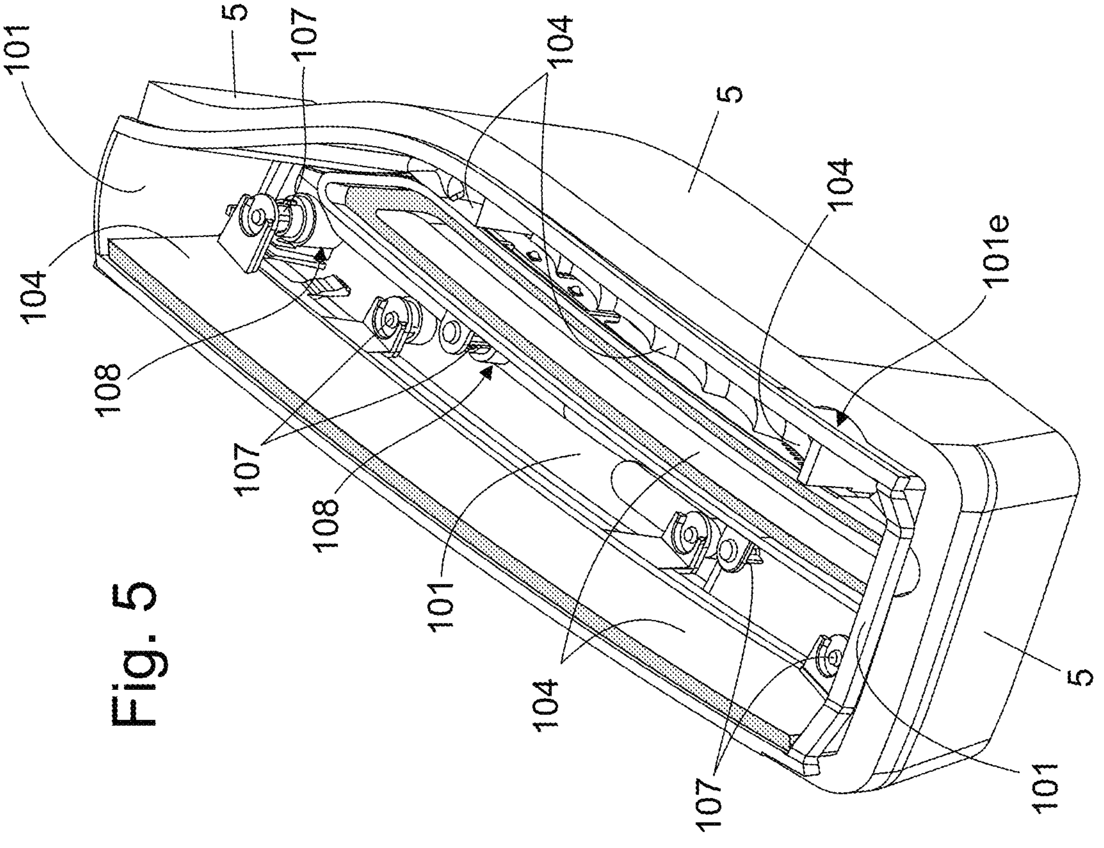

With reference to FIG. 5, after realizing the rear casing 101 and the internal component(s) 104, assembly of automotive lighting unit 100 preferably comprises the step of placing the rear casing 101 in the receiving seat of the workpiece carrying fixture 2, or rather inside the receiving compartment 5*a* of workpiece carrying template 5; and advantageously also the step of locking/immobilizing the same rear casing 101 in the workpiece carrying fixture 2, or rather inside the compartment 5*a* of the workpiece carrying template 5.

After having placed and advantageously also locked the rear casing 101 into the workpiece carrying fixture 2, the assembly of automotive lighting unit 100 preferably comprises the step of placing the internal lighting component(s) 104 inside the rear casing 101 stationary in the workpiece carrying fixture 2, each resting on the inner surface of the rear casing 101 in at least one respective contact zone 105.

With reference to FIGS. 7 and 8, after resting the internal lighting component(s) 104 on the inner surface of rear casing 101, the assembly of automotive lighting unit 100 comprises the step of activating the laser appliance 3 so as to direct one or more laser beams r against the outer surface 101*e* of the rear casing 101 stationary in the workpiece carrying fixture 2, towards the contact zone(s) or area(s) 105 between the rear casing 101 and one or more internal lighting components 104 present inside the rear casing 101, causing the laser beam(s) r to pass through the internal laser path(s) of the workpiece carrying fixture 2.

In further detail, the assembly of automotive lighting unit 100 entails directing the laser beam(s) r towards the outer surface 101*e* of the rear casing 101, via the internal through passage(s) 7 of the workpiece carrying template 5, so that the laser beams r can reach the outer surface 101*e* of the rear casing 101 substantially without energy losses.

In addition, before activating the laser appliance 3, the assembly of automotive lighting unit 100 preferably also comprises the step of activating the locking assembly 4 so as to immobilize and/or press the internal lighting component(s) 104 to be welded against the inner surface of the rear casing 101 accommodated in the workpiece carrying fixture 2.

In further detail, the assembly of automotive lighting unit 100 preferably entails introducing the locking assembly 4, or rather the locking template 13, inside the rear casing 101 accommodated in the workpiece carrying fixture 2, so that the locking assembly 4, or rather the shaped protrusion(s) 13*a* of locking template 13, can reach and immobilize and/or press the internal lighting component(s) 104 against the inner surface of the same rear casing 101, at the contact area(s) or zone(s) 105.

With reference to FIGS. 1, 5, 6 and 7, in the illustrated example, in particular, the assembly of automotive lighting unit 100 preferably entails moving the workpiece carrying template 5 of workpiece carrying fixture 2 in the direction d so as to arrange the shaped protrusion(s) 13*a* of the locking template 13 in abutment on the internal component(s) 104 to be welded, above the contact area(s) or zone (s) 105, in order to immobilize and/or locally press said internal components 104 to be welded against the inner surface of the rear casing 101.

While the locking template 13 presses the internal component or components 104 to be welded against the inner surface of the rear casing 101, the assembly of automotive lighting unit 100 furthermore entails temporarily activating the laser appliance 3, or rather the laser source 10, so as to generate the laser beam(s) r that pass through, in succession, the internal laser path(s) of workpiece carrying fixture 2 and the thickness of the rear casing 101, up to reach the internal component(s) 104.

After making the various laser welding joints 106, the assembly of automotive lighting unit 100 preferably entails removing from the workpiece carrying fixture 2 the rear casing 101 and the internal lighting component(s) 104 rigidly integral therewith.

The advantages resulting from the use of the assembly method described above and of the automotive-lighting-units assembly machine 1 are considerable.

The fixing of the internal lighting components 104 to the rear casing 101 by means of the laser welding joints 106 allows to eliminate all, or in any case the majority of, the self-threading metal screws normally used to fix the internal lighting components to the rear casing of the automotive lighting unit, thus considerably reducing the resulting weight and production costs.

In addition, the laser welding with the aid of laser beams r that are substantially cone-shaped so as to be focused/concentrated in focal points P located at the contact areas 105 which the laser beams r are directed to, or alternatively spaced at the back of the related contact areas 105, solves all the operating limits connected to contact areas 105 flanked/delimited by pieces or portions of piece made of polymeric material opaque to visible light.

Furthermore, the immediate fixing of the internal component(s) 104 by means of the laser welding joints 106 allows to eliminate, or at least drastically reduce, the number of shoulders, centring pins and/or snap-on locking tabs usually present inside the rear casing of an automotive lighting unit, thus considerably simplifying the structure of the mould used to produce the rear casing 101.

The creation of these centring and/or snap-on locking systems, in fact, results in an extremely complicated shape of the mould used to produce the rear casing of an automotive lighting unit assembled in a traditional manner.

Last but no less important, the above-described automotive-lighting-units assembly machine 1 allows to simplify the automotive-lighting-unit assembly line, with all advantages that this entails.

In fact, the automatic or semi-automatic screwdrivers are no longer necessary.

Finally, it is clear that modifications and variations may be made to the assembly method of automotive lighting unit 100 and the automotive-lighting-units assembly machine 1 without however departing from the scope of the present invention.

For example, in a first embodiment variation of machine 1, the laser appliance 3 may comprise a series of independent laser sources, each of which emits, on command, a laser beam and is located in or aligned to a respective internal laser path of the workpiece carrying fixture 2, or rather to an internal through passage 7 of the workpiece carrying template 5, so as to direct its laser beam only inside said internal laser path.

Clearly, in this embodiment, activation and deactivation of the independent laser sources may not occur simultaneously for all the laser sources.

In a second embodiment variation of machine 1, on the other hand, the laser appliance 3 may comprise, instead of the bundle of optic fibres 11, a movable laser deflector, which is capable to divert, on command, the laser beam 106 produced by the laser source 10, as required and alternatively, towards the inlet of any one of the internal laser paths of workpiece carrying fixture 2, or rather of the internal through passages 7 of workpiece carrying template 5.

In this variation, therefore, the laser welding joints 106 may be made one after the other, preferably according to a given time sequence.

In a third embodiment variation of machine 1, in addition, the laser appliance 3 may comprise, in place of the bundle of optic fibres 11, a movable robotic arm, which supports the laser source and is capable to align, on command, the laser source to any one of the internal laser paths of workpiece carrying fixture 2, or rather of the internal through passages 7 of workpiece carrying template 5, so as to direct the laser beam r in succession towards the various contact areas 105 between the rear casing 101 and the internal lighting component(s) 104.

Figure 9:
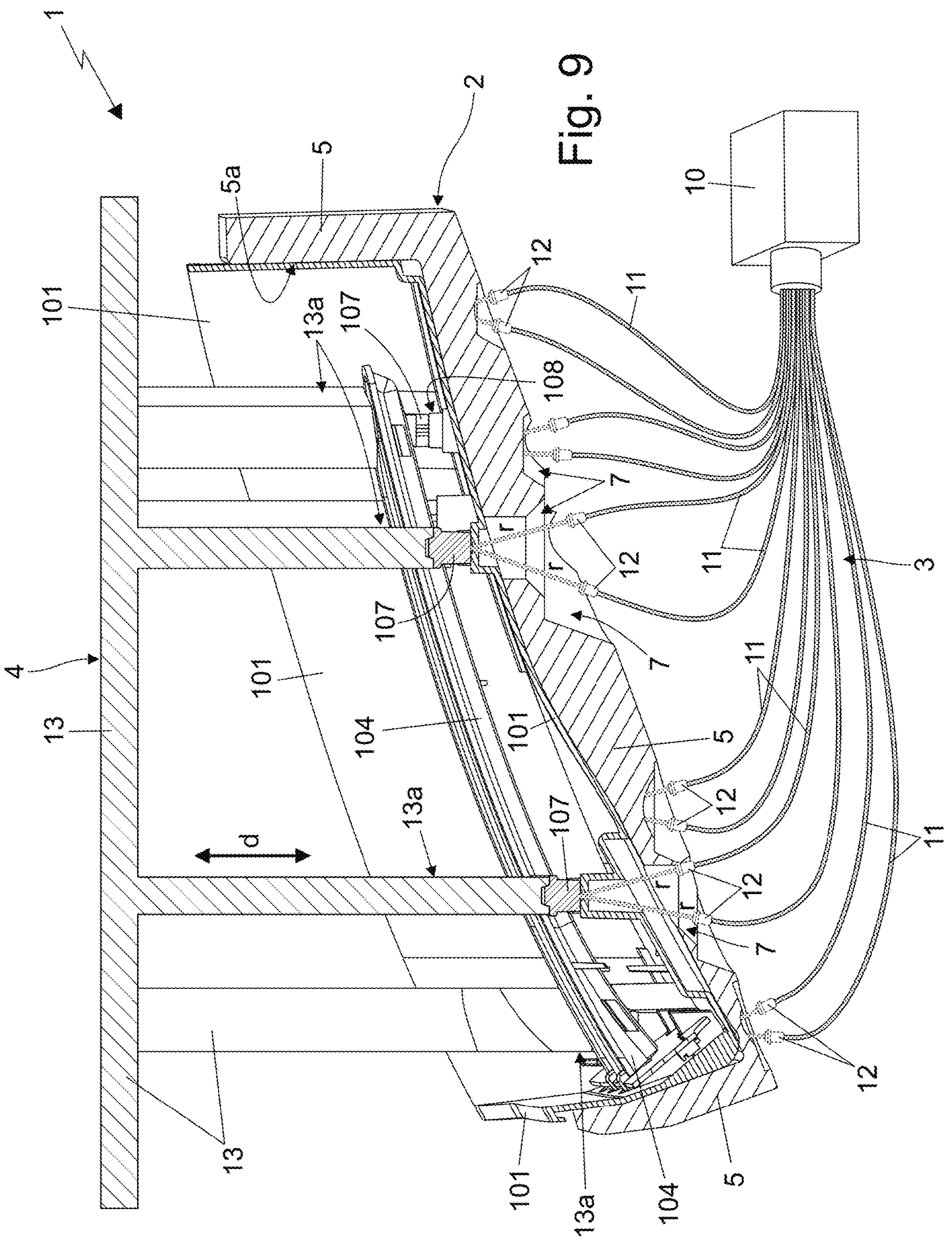
FIG. 9 is a schematic front view of a second variation of the automotive-lighting-units assembly machine illustrated in FIG. 1, with parts in section and parts removed for clarity's sake.

With reference to FIG. 9, furthermore, in a different embodiment, the laser appliance 3 is preferably structured so as to generate and direct, from different directions, a plurality of separate and distinct laser beams r towards the workpiece carrying fixture 2, so that at least a part of these laser beams r crosses/intersects inside the workpiece carrying fixture 2, at an intersection point located at the contact area 105 between the rear casing 101 and an internal lighting component 104, thus to make at least one laser welding joint 106 at the same contact area 105.

In other words, the assembly of automotive lighting unit 100 preferably entails directing, from different directions and for a predefined time interval, a plurality of laser beams r towards a same contact area 105 located inside the workpiece carrying fixture 2, so as to intersect said laser beams at an intersection point that is located substantially at the contact area 105, in order to melt (solely) the polymeric material present in the neighbourhood of said contact area 105.

In further detail, at the intersection point the energies transmitted by the laser beams r to the polymeric material add to one another so as to heat (solely) the opaque polymeric material located in the neighbourhood of the contact area 105 up to the melting/softening temperature of the polymeric material.

By intersecting an appropriate number of laser beams r only at the contact area 105, it is therefore possible to maintain, almost up to the contact area 105, the energy density at relatively low values that can be easily withstood by the opaque polymeric material forming the rear half-shell 101 without melting or sustaining structural damages.

Clearly, the laser appliance 3 and the workpiece carrying fixture 2 are structured so that the laser beams r reach/strike the outer surface 101*e* of the rear casing 101 travelling along the or at least one of the internal laser paths of the workpiece carrying fixture 2.

The intersection point of the laser beams r, therefore, is located beyond the or one of the internal laser paths of the workpiece carrying fixture 2, inside the workpiece carrying fixture 2.

Also in this case, therefore, the laser appliance 3 is structured and coupled to the workpiece carrying fixture 2 so that the laser beams r reach the rear casing 101 stationary in the workpiece carrying fixture 2 without passing through the mouth of the same rear casing 101.

In further detail, the laser appliance 3 is adapted to direct at least two different laser beams r into the workpiece carrying fixture 2, from two different directions and through at least one internal laser path of the workpiece carrying fixture 2, so that said laser beams r reach the outer surface 101*e* of the rear casing 101 stationary in the workpiece carrying fixture 2, penetrate into the rear casing 101 throughout the local thickness of the casing, and intersect/cross at an intersection point located inside the workpiece carrying fixture 2, at the contact area 105 between the rear casing 101 and the internal lighting component 104, thus to locally add the powers of the same laser beams r.

Clearly the laser appliance 3 may also direct more than two laser beams r towards the same intersection point.

With reference to FIG. 9, in the illustrated example each internal laser path of the workpiece carrying fixture 2 is aligned to a respective contact area 105, and is preferably adapted to be crossed by a plurality of laser beams r directed towards the same contact area 105 from different directions.

Clearly, in a different embodiment, several internal laser paths of the workpiece carrying fixture 2 may be aligned to the same contact area 105, each of them may preferably be adapted to be crossed/traversed by a single laser beam r directed towards the same contact area 105.

In addition, the laser appliance 3 preferably comprises: at least one electrically-powered laser source 10 which is capable to emit, on command, a high-power laser beam, advantageously with predefined and substantially constant intensity and/or emission spectrum; and a plurality of optic fibres 11, which terminate in the area of at least one internal laser path of the workpiece carrying fixture 2, and are optically coupled to the laser source 10 so as to split and channel the laser beam emitted by the laser source 10 to said at least one internal laser path.

The distal ends of two or more optic fibres 11 are therefore adapted to direct/address their laser beam r into the workpiece carrying fixture 2, towards a same contact area or zone 105 between the rear casing 101 and an internal lighting component 104.

In addition, the laser appliance 3 preferably comprises, for each optic fibre 11, also an optical beam conditioning device 12, which is located downstream of the distal end of the optic fibre 11 so as to be crossed by the laser beam r coming out of the same optic fibre 11, and is structured so as to collimate, and optionally also slightly focus, said laser beam r in a predefined direction that intersects said intersection point, advantageously inside the receiving seat of the workpiece carrying fixture 2, or rather the compartment 5*a* of the workpiece carrying template 5.

Two or more optical beam conditioning devices 12 are therefore aligned to the same contact area 105 between the rear casing 101 and the internal lighting component 104.

In this variation, the step of making said at least one laser welding joint 106 entails directing, from different directions and for a given time interval advantageously less than 30 s (seconds), two or more separate and distinct laser beams r towards the contact area 105, so that said plurality of laser beams r crosses/intersects at an intersection point, which is located at the contact area 105 between the rear casing 101 and the internal component 104, thus to locally add their powers and heat up to the melting/softening temperature (only) the opaque polymeric material located in the neighbourhood of the contact area 105.

Lastly, in a non-illustrated, more sophisticated embodiment of machine 1, even the locking assembly 4, or rather the locking template 13, may be provided with one or more internal laser paths that allow one or more laser beams to reach an internal lighting component 104, at its resting area or zone 105 to the rear casing 101.

In this more sophisticated embodiment, furthermore, the machine 1 is advantageously also provided with a second laser appliance which is coupled to the locking assembly 4, or rather to the locking template 13, so as to direct its laser beam or beams inside the rear casing 101, through the internal laser path or paths of the locking assembly 4.

The invention claimed is:

1. An assembly method of an automotive lighting unit that comprises: a concave-shaped rear casing, which has a substantially rigid and opaque structure and is adapted to be fixed to the vehicle body; a front half-shell, which has a substantially rigid and transparent structure and is arranged to close the mouth of said rear casing; at least one lighting assembly, which is located inside the rear casing and is adapted to backlight a corresponding transparent or semi-transparent sector of the front half-shell; and one or more internal lighting components that are fixed in abutment on the inner surface of the rear casing at respective contact areas or zones;

the assembly method comprising the steps of:

realizing the rear casing;

realizing at least one internal lighting component having at least one portion made of opaque polymeric material;

placing said at least one internal lighting component inside the rear casing, with said portion made of opaque polymeric material resting on the rear casing, in at least one contact zone;

making at least one laser welding joint at said contact area, so as to rigidly fix said at least one internal lighting component to the rear casing.

2. The assembly method of an automotive lighting unit according to claim 1, wherein the step of making said at least one laser welding joint entails directing one or more laser beams towards said contact area, through the thickness of the rear casing, so as to reach and heat the polymeric material located in the neighbourhood of the contact area up to melting/softening temperature.

3. The assembly method of an automotive lighting unit according to claim 2, wherein the step of making said at least one laser welding joint entails directing, for a predefined time interval, a laser beam towards said contact area, concentrating the same laser beam in a focal point which is located at said contact area or behind said contact area, at a predefined distance from the contact area, in order to melt the polymeric material present in the neighbourhood of said contact area.

4. The assembly method of an automotive lighting unit according to claim 2, wherein the step of making said at least one laser welding joint entails directing, from different directions and for a predefined time interval, a plurality of laser beams towards said contact area, so as to intersect said laser beams at an intersection point that is located substantially at the contact area, in order to melt the polymeric material present in the neighbourhood of said contact area.

5. The assembly method of an automotive lighting unit according to claim 2, wherein the step of making said at least one laser welding joint additionally comprises the step of pressing, at said contact area, said at least one internal lighting component against the inner surface of the rear casing while said laser beam or beams heat the polymeric material.

6. The assembly method of an automotive lighting unit according to claim 2, wherein the step of making said at least one laser welding joint additionally comprises the step of immobilizing said at least one internal lighting component inside the rear casing while said laser beam or beams heat the polymeric material.

7. The assembly method of an automotive lighting unit according to claim 1, wherein said method comprises, before the step of making said at least one laser welding joint, the step of placing the rear casing on a workpiece carrying fixture, which is provided with a receiving seat adapted to accommodate the rear casing and with one or more internal laser paths, each of which is structured so as to allow the laser beam(s) to pass through the workpiece carrying fixture substantially without energy losses, up to reach the rear casing accommodated in the same workpiece carrying fixture.

8. The assembly method of an automotive lighting unit according to claim 7, further comprising the step of locking/immobilizing the rear casing in the receiving seat of the workpiece carrying fixture.

9. The assembly method of an automotive lighting unit according to claim 1, wherein at least a part of said internal lighting components concurs in forming said at least one lighting assembly.

10. An automotive-lighting-units assembly machine comprising:

a workpiece carrying fixture, which is provided with a receiving seat adapted to accommodate the rear casing of the automotive lighting unit to be assembled, with one or more internal components inside resting on the inner surface of said rear casing at one or more contact areas; and a laser appliance, which is adapted to generate and direct at least one laser beam towards the rear casing accommodated in the workpiece carrying fixture;

wherein said laser appliance is adapted to directing said at least one laser beam towards the workpiece carrying fixture, in a direction such as to intersect at least one contact area between the rear casing and an internal lighting component, in order to make at least one laser welding joint at said contact area; the workpiece carrying fixture and the laser appliance being structured so that said at least one laser beam reaches said contact area passing through the thickness of the rear casing accommodated in said workpiece carrying fixture.

11. The automotive-lighting-units assembly machine according to claim 10, wherein the workpiece carrying fixture is provided with at least one internal laser path, which extends through the workpiece carrying fixture up to said receiving seat, is substantially aligned to said contact area, and is structured so as to allow said laser beam to pass through the workpiece carrying fixture up to said receiving seat; the laser appliance being coupled to the workpiece carrying fixture so that said at least one laser beam reaches the receiving seat of the workpiece carrying fixture travelling along said at least one internal laser path.

12. The automotive-lighting-units assembly machine according to claim 11, wherein the workpiece carrying fixture comprises a workpiece carrying template with a substantially non-deformable structure; said receiving seat and said at least one internal laser path being provided in said workpiece carrying template.

13. The automotive-lighting-units assembly machine according to claim 11, wherein the laser appliance is adapted to focus/concentrate said laser beam in a focal point, which is located beyond said internal laser path, inside the workpiece carrying fixture, spaced at the back of said contact area or at said contact area.

14. The automotive-lighting-units assembly machine according to claim 11, wherein the laser appliance is adapted to direct a plurality of laser beams from different directions towards the workpiece carrying fixture, so as to cross said laser beams in at least one intersection point, which is located beyond the internal laser path, inside the workpiece carrying fixture at said contact area.

15. The automotive-lighting-units assembly machine according to claim 11, wherein the laser appliance comprises: at least one electrically-powered laser source that is capable of emitting a laser beam on command; and one or more optic fibres, each of which ends at said at least one internal laser path of the workpiece carrying fixture and is optically coupled to said laser source so as to channel the laser beam up to the internal laser path.

16. The automotive-lighting-units assembly machine according to claim 12, wherein the receiving seat in the workpiece carrying template has a shape substantially complementary to that of the rear casing.

17. The automotive-lighting-units assembly machine according to claim 12, wherein the workpiece carrying fixture additionally comprises locking means adapted to selectively lock/immobilize the rear casing in the receiving seat of the workpiece carrying template.

18. The automotive-lighting-units assembly machine according to claim 12, wherein said internal laser path comprises a through hole, opening or straight duct provided in the body of the workpiece carrying template.

19. The automotive-lighting-units assembly machine according to claim 10, additionally comprising a locking assembly, which is movable from and towards the workpiece carrying fixture or vice versa, and is adapted to immobilize and/or press against the inner surface of the rear casing accommodated in the workpiece carrying fixture one or more internal lighting components present inside said rear casing.

20. The automotive-lighting-units assembly machine according to claim 19, wherein the receiving seat of the workpiece carrying template is provided with an access mouth through which the rear casing is inserted and removed from the workpiece carrying template; the locking assembly being arranged in front of the mouth of the receiving seat of the workpiece carrying template and being movable in substantially rectilinearly from and towards said receiving seat or vice versa.

21. The automotive-lighting-units assembly machine according to claim 19, wherein the locking assembly comprises a locking template that is provided with one or more shaped protrusions, each of which is shaped so as to penetrate inside the rear casing accommodated in the workpiece carrying fixture, through the mouth of the same rear casing, to immobilize and/or press a corresponding internal lighting component in abutment against the inner surface of the rear casing.

* * * * *